Dec. 17, 1946.   J. A. KOSEK   2,412,778
SUSPENSION TYPE FLOORING FOR AIRCRAFT
Filed Dec. 18, 1944    4 Sheets-Sheet 1
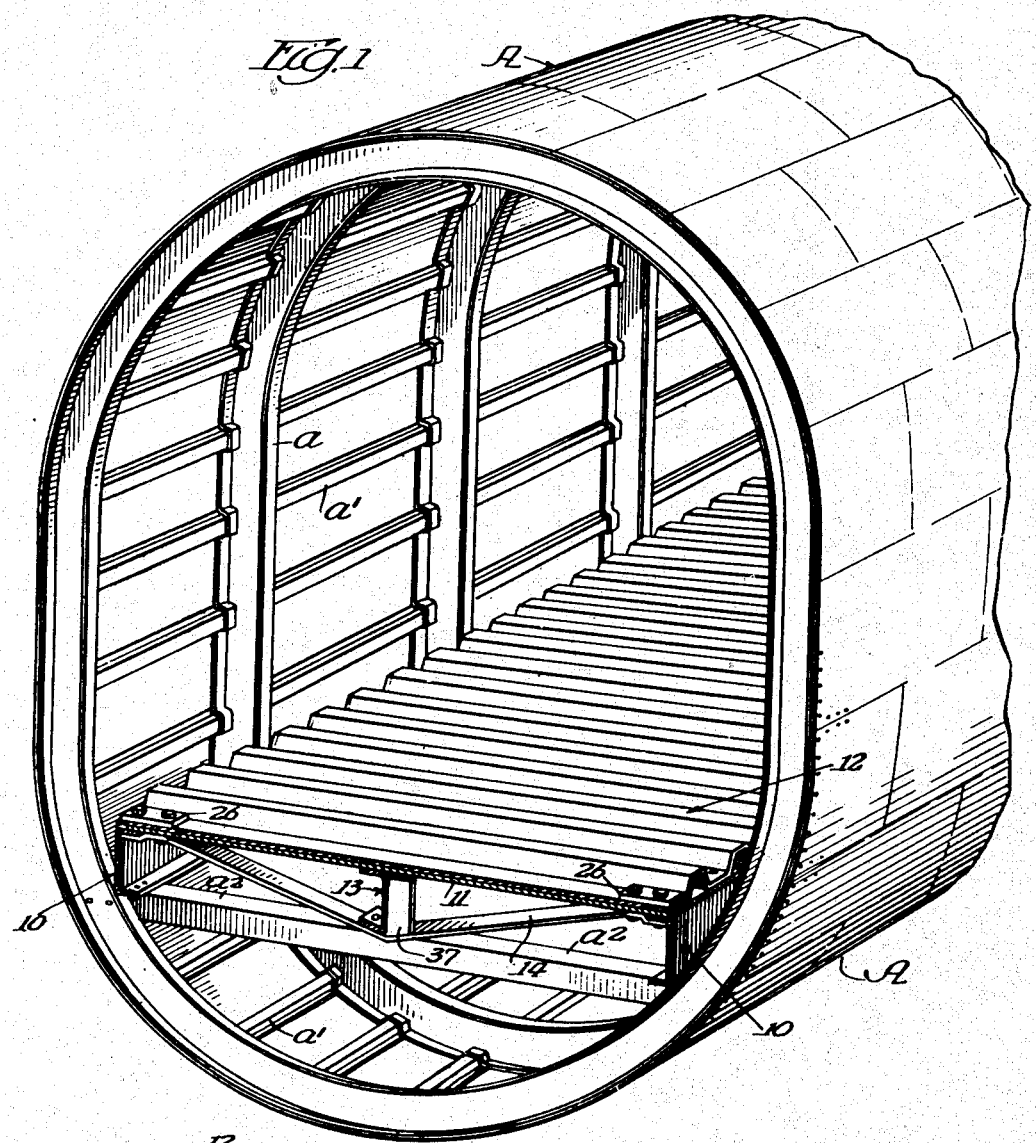
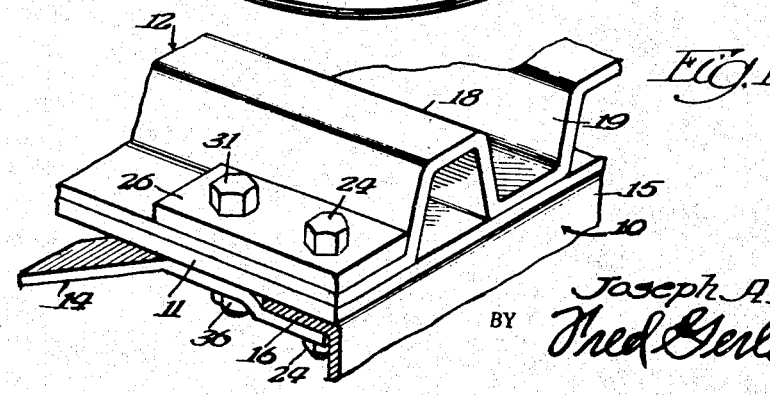
INVENTOR.
Joseph A. Kosek
BY Fred Gerlach
Atty.

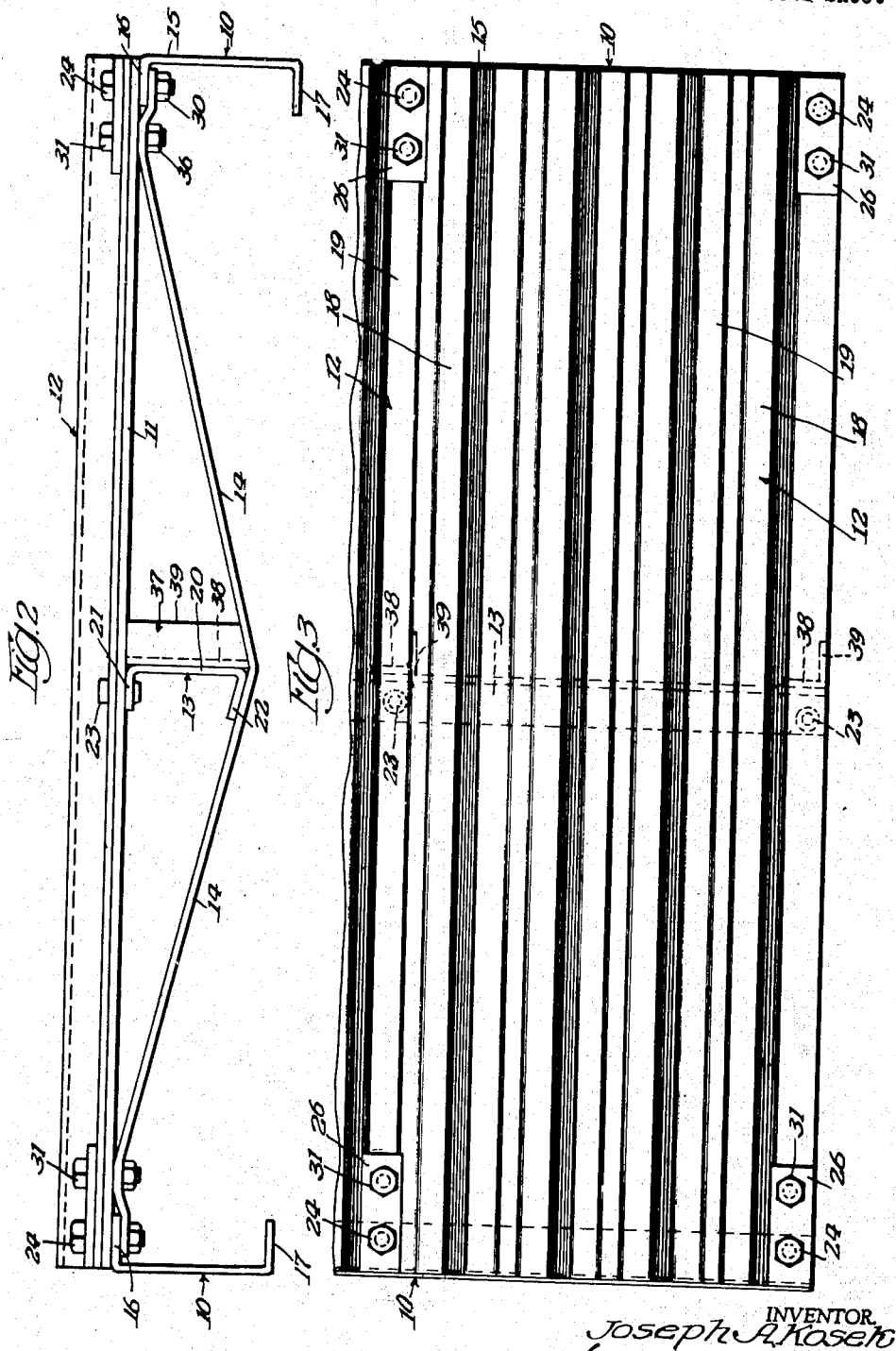

Dec. 17, 1946. J. A. KOSEK 2,412,778
SUSPENSION TYPE FLOORING FOR AIRCRAFT
Filed Dec. 18, 1944 4 Sheets-Sheet 3
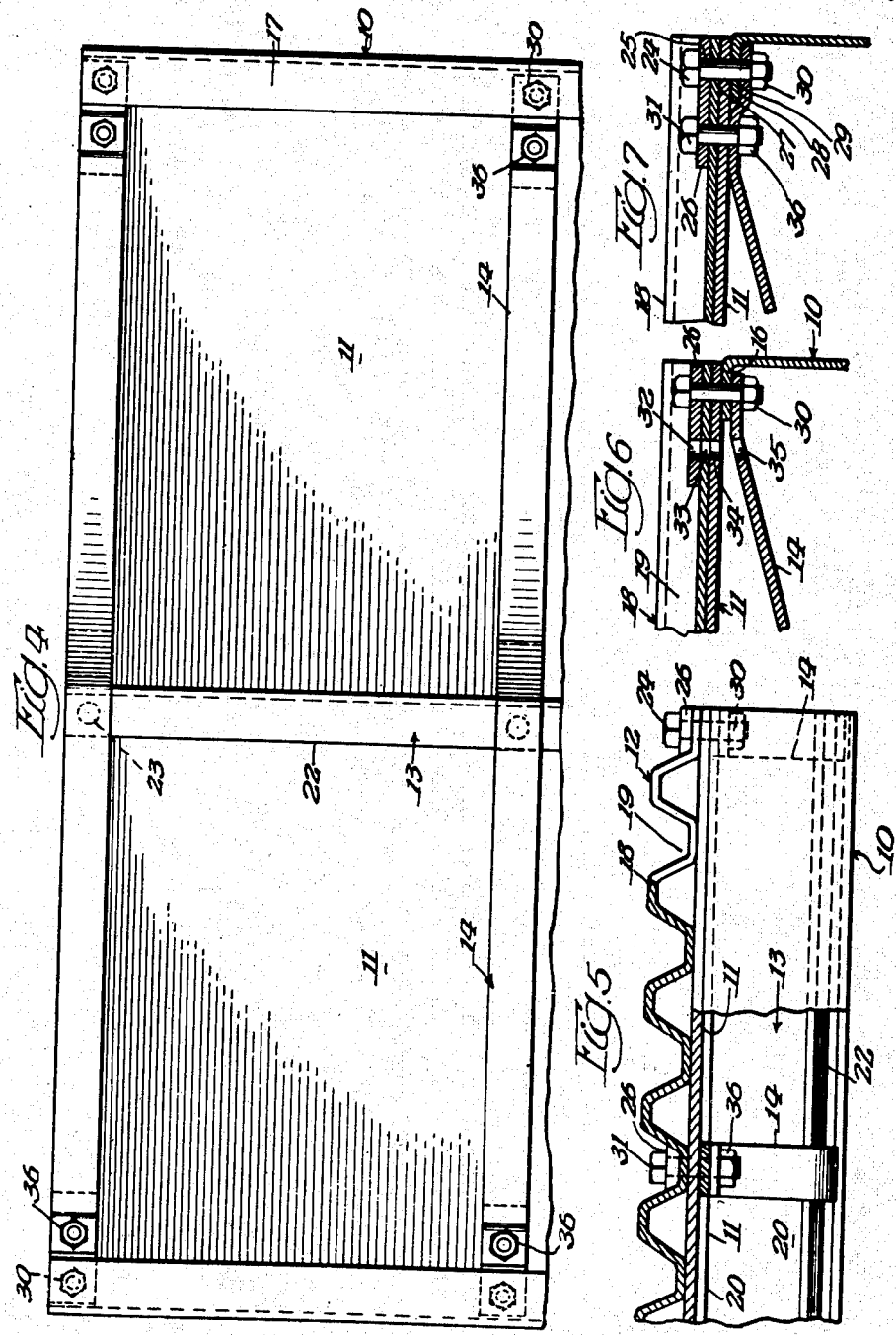
INVENTOR.
Joseph A. Kosek
BY Fred Gerlach
Atty Dec. 17, 1946.   J. A. KOSEK   2,412,778
SUSPENSION TYPE FLOORING FOR AIRCRAFT
Filed Dec. 18, 1944   4 Sheets-Sheet 4
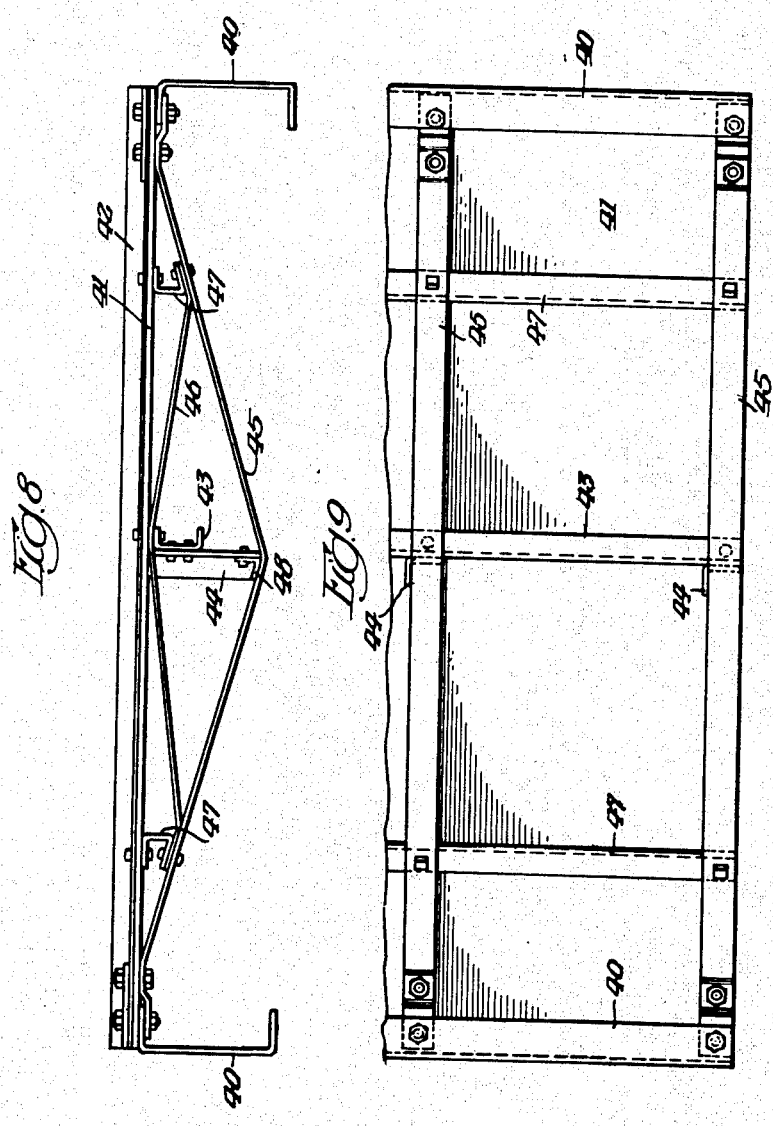
INVENTOR.
Joseph A. Kosek
BY Fred Gerlach
Atty.

Patented Dec. 17, 1946

2,412,778

UNITED STATES PATENT OFFICE 2,412,778

SUSPENSION TYPE FLOORING FOR AIRCRAFT

Joseph A. Kosek, Fort Worth, Tex., assignor to Consolidated Vultee Aircraft Corporation, San Diego, Calif., a corporation of Delaware Application December 18, 1944, Serial No. 568,691

10 Claims. (Cl. 189—34)

The present invention relates generally to flooring. More particularly the invention relates to that type of flooring which is primarily designed for use in an aircraft and comprises a transversely corrugated horizontally extending tread forming panel and in addition a pair of parallel laterally spaced sill-forming beams which underlie and are connected to the side margins of the corrugated panel and serve to support the latter in suspension as well as in spaced relation with the subjacent portion of the aircraft.

One object of the invention is to provide an aircraft flooring of this type which is an improvement upon and has certain inherent advantages over previously designed flooring for the same purpose and is characterized by the fact that it is essentially of simple design and possesses an extremely high strength-weight ratio.

Another object of the invention is to provide an aircraft flooring in which the various component parts thereof are so constructed, designed and arranged that the corrugations of the panel may be made of minimum height and width to the end that the panel as a whole provides an effective and efficient tread surface. Another object of the invention is to provide an aircraft flooring of the type under consideration which comprises a longitudinally extending beam under the central portion of the corrugated panel and also comprises a series of spaced apart V-shaped straps the central or apex portions of which underlie the centrally disposed beam and the ends of which are so connected to the junctures of the side margins of the corrugated panel and the upper portions of the sill-forming side beams that the straps as a whole are under tension and hence effectively counteract any load which is imposed on the corrugated tread forming panel.

A further object of the invention is to provide an aircraft flooring of the last mentioned character in which the sill-forming side beams beneath the side margins of the corrugated tread forming panel are in the form of channel beams and are so positioned that the flanges thereof extend inwards and have the ends of the V-shaped straps attached to their top flanges.

A still further object of the invention is to provide an aircraft flooring which may be fabricated or produced with facility and at a low cost.

Other objects of the invention and the various advantages and characteristics of the present aircraft flooring will be apparent from a consideration of the following detailed description.

The invention consists in the several novel features which are hereinafter set forth and are more particularly defined by the claims at the conclusion hereof.

In the drawings which accompany and form a part of this specification or disclosure and in which like letters and numerals of reference denote corresponding parts throughout the several views:

Figure 1 is a fragmentary perspective of an airplane fuselage having applied thereto a flooring embodying one form of the invention;

Figure 1a is an enlarged fragmentary perspective of one corner of the flooring of Figure 1;

Figure 2 is an end view;

Figure 3 is a plan view;

Figure 4 is a bottom view;

Figure 5 is a side elevational view;

Figures 6 and 7 are enlarged sections illustrating in detail the manner in which the ends of the V-shaped straps are connected to the top flanges of the sill-forming side beams so as to place the straps under tension;

Figure 8 is an end view of a flooring embodying another or modified form of the invention; and Figure 9 is a bottom view of the flooring of Figure 8.

The flooring which is shown in Figures 1 to 7, inclusive, of the drawings constitutes one form or embodiment of the invention and is illustrated in connection with an airplane fuselage A. The fuselage A is of standard or conventional construction and comprises a series of spaced apart continuous cross ribs $a$ and a plurality of longitudinally extending laterally spaced stringers $a^1$. As well understood in the art, the stringers are secured to the outer marginal portion of the cross ribs $a$ and have skin forming panels affixed thereto. The cross ribs $a$ have across the bottom portions thereof horizontal cross braces $a^2$ which are horizontally aligned and have the ends thereof fixedly secured to the cross ribs. The flooring of Figures 1 to 7, inclusive, overlies the cross braces $a^2$ and comprises as its main or principal components a pair of sill-forming channel beams 10, a flat plate 11, a corrugated panel 12, an intermediate channel beam 13 and a series of V-shaped straps 14. It is essentially of unitary construction and forms the floor of the airplane fuselage A.

The channel beams 10 are positioned in laterally spaced parallel relation and extend lengthwise of the fuselage. They rest on the ends of the cross braces $a^2$ and consist of flat vertically extending webs 15, integral inwardly extending horizontal top flanges 16 along the upper marginal portions of the webs, and integral inwardly extending horizontal bottom flanges 17 along the lower marginal portions of said webs. The bottom flanges 17 of the sill-forming channel beams 10 fit against and are suitably secured to the ends of the cross braces $a^2$.

The plate 11 is rectangular so far as contour or conformation is concerned and extends lengthwise of the airplane fuselage A. It overlies and extends between the sill-forming channel beams 10 and is arranged so that the side margins thereof rest directly upon the top flanges 16 of the said channel beams 10. Preferably the side edges of the plate 11 and the outer faces of the webs 15 of the channel beams 10 are coplanar. The plate 11 is for the most part imperforate and may be formed of any rigid light metal or other material.

The corrugated panel 12 overlies and is coextensive with the plate 11 and embodies a longitudinal series of spaced apart transversely extending ridges 18 and transversely extending grooves 19 between the ridges. Preferably the portions of the panel 12 which form the tops of the ridges 18 are flat and the portions of the panel that define the bottoms of the grooves are also flat. By reason of the fact that the ridges 18 extend transversely the panel 12 is reinforced against transverse bending or flexure. The panel 12 forms the tread surface or part of the flooring.

The intermediate channel beam 13 extends across and depends from the central portion of the plate 11 and is disposed midway between and in parallel relation with the sill-forming channel beams 10 that are beneath the side margins of the plate 11 and the transversely corrugated plate 12. It is formed of any suitable light metal and comprises a vertically extending web 20, an integral top flange 21 and an integral bottom flange 22. The top flange 21 of the beam 13 extends horizontally, fits flatly against the central portion of the plate 11 and is secured in place by rivets 23. The shanks of the rivets extend through aligned or registering holes in the top flange 21, the plate 11 and the corrugated panel 12. The bottom flange 22 of the beam 13 projects in the same direction as the top flange 21 and is upwardly inclined as best shown in Figures 1 and 2.

The V-shaped straps 14 extend transversely of the airplane fuselage A, underlie the plate 11 and are spaced equidistantly apart. They are vertically aligned with, and are substantially the same in width as, the portions of the corrugated panel 12 that define certain of the grooves 19 and are preferably formed of flat light metal stock. The apex or central portions of the straps 14 underlie and abut against the lower or bottom marginal portion of the web 20 of the channel beam 13. The ends of the straps 14 extend horizontally outwards, fit flatly against the bottom faces of the inwardly extending top flanges 16 of the sill-forming channel beams 10, and are secured in place by vertically extending bolts 24. The bolts are preferably arranged so that the heads are on the upper ends of the shanks. The shanks of the bolts 24 extend through holes 25 in reinforcing plates 26, holes 27 in the corrugated panel 12, holes 28 in the plate 11 and holes 29 in the top flanges 16 of the channel beams 10. The reinforcing plates 26 are mounted on the ends of the portions of the corrugated panel that overlie the ends of the V-shaped straps 14. The holes 25, 27, 28 and 29 are the same in size and as shown in Figures 6 and 7 are in vertical alignment. The lower ends of the shanks of the bolts 24 are provided with nuts 30 which together with the heads on the upper ends of the shanks serve to maintain the reinforcing plate 26 and the subjacent portions of the corrugated panel 12, the plate 11 and the top flanges 16 in clamped relation. The portions of the V-shaped straps 14 that are directly inwards of the ends of the straps are flat and horizontally aligned with the ends of the straps prior to assembly of the flooring. They are anchored in place by means of vertically extending bolts 31 which is best shown in Figures 6 and 7 of the drawings; the bolts 31 are located inwards of the bolts 24 and the top flanges 16 of the sill-forming channel beams 10 and are arranged so that the heads are on the upper ends of the shanks. The shanks of the bolts 31 extend through holes 32 in the inner ends of the reinforcing plates 26 and registering holes 33, 34 and 35 which are formed respectively in the subjacent portions of the corrugated panel 12, the plate 11 and the straps 14, and carry nuts 36 on their lower ends. In assembling the flooring the nuts 36 are tightened to their fullest extent with the result that the portions of the straps that are directly inwards of the strap ends are upwardly deflected or distorted and hence place the straps under tension at all times. By reason of the fact that the V-shaped straps 14 are under tension they operate through the medium of the intermediate channel beam 13 to exert an upward force on the plate 11 and the corrugated panel 12 and hence counteract any load which is imposed on the corrugated panel.

In addition to the parts heretofore described the flooring of Figures 1 to 7, inclusive, comprises a rectilinear series of spaced apart vertically extending angle bar type stiffeners 37. These stiffeners correspond in number to and are associated respectively with the V-shaped straps 14 and consist of longitudinally extending legs 38 and transversely extending legs 39. The longitudinally extending legs 38 are welded, bolted or otherwise fixedly secured to the web 20 of the intermediate channel beam 13 and have the upper ends thereof in abutment with the central portion of the plate 11. As shown in the drawings the angle bar stiffeners 37 are mounted on the side of the web 20 that is opposite the side to which the top and bottom flanges 21 and 22 are connected. The transversely extending legs 39 of the stiffeners 37 extend at right angles to the longitudinally extending legs 38 and have the lower ends thereof beveled or angled so that they abut directly against the subjacent portions of the straps 14. The stiffeners 37 assist the intermediate channel beam 13 in transmitting to the plate 11 and the corrugated panel 12 the upward force resulting from the straps 14 being under tension.

The flooring of Figures 1 to 7, inclusive, may be made extremely light in weight while at the same time it possesses maximum strength due to the fact that the V-shaped straps 14 are under tension at all times and exert on the corrugated panel an upward force in opposition to any load which is imposed on the corrugated panel. Because of the specific design, arrangement and construction of the various component parts the flooring is capable of being assembled with facility and may be produced at a low cost. Also because of the design and construction of the parts the corrugations of the panel 12 may be made of minimum height and width to the en that the panel as a whole provides an effective and efficient tread surface. In view of the fact that the flooring has an extremely high strength-weight ratio the flooring may be used to exceptionally good advantage in aircraft construction.

The flooring which is shown in Figure 8 of the drawings constitutes another form or embodiment of the invention. It is adapted to be used where a comparatively wide transverse span is encountered and comprises a pair of parallel laterally spaced longitudinally extending sill-forming channel beams 40, a rectangular longitudinally extending plate 41, a rectangular longitudinally extending corrugated panel 42, an intermediate channel beam 43, vertically extending stiffeners 44, a series of V-shaped straps 45, a corresponding series of inverted V-shaped straps 46 and a pair of secondary channel beams 47. The sill-forming channel beams 40, the plate 41, the corrugated panel 42 and the V-shaped straps 45 are the same as the beams 10, the plate 11, the corrugated panel 12 and the V-shaped straps 14 of the flooring of Figures 1 to 7, inclusive, except that they are larger. They are connected together and arranged in the same manner as the corresponding parts of the flooring of Figures 1 to 7, inclusive, and function or operate in the same manner. The intermediate channel beam 43 underlies and extends lengthwise of the central portion of the plate 41 and is of less height than the central or intermediate portions of the V-shaped straps 45. The vertically extending stiffeners 44 are in the form of angle bars and correspond in number to and are associated respectively with the straps 45. They embody longitudinally extending legs and transversely extending legs and have angle bracket type feet 48 at their lower ends. The upper ends of the longitudinally extending legs of the stiffeners 44 are bolted to the web of the intermediate channel beam 43 and the upper ends of the transversely extending legs abut directly against the central portion of the plate 41. The feet 48 are fixedly secured to the lower ends of the longitudinally extending legs of the stiffeners and fit within the apex portions of the straps 45. Said stiffeners 44 serve to impart the upward compression forces of the straps 45 to the central portions of the plate 41 and the corrugated panel 42. The inverted V-shaped straps 46 overlie the V-shaped straps 45 and are arranged so that the central or apex portions thereof rest on the top flange of the intermediate channel beam 43. The ends of the inverted V-shaped straps are bent upwards and fit flatly against the portions of the straps 45 that are directly inwards of the anchored or bolted ends. The secondary channel beams 47 are disposed directly inwards of and in parallel relation with the sill-forming channel beams 40 and overlie the upwardly bent ends of the inverted V-shaped straps 46. They are arranged so that the top and bottom flanges thereof project or face outwards and have their top flanges bolted or otherwise fixedly secured to the superjacent portions of the plate 41 and the corrugated panel 42. The bottom flanges of the secondary channel beams 47 are bolted to the upwardly bent ends of the inverted V-shaped straps 46 and the subjacent portions of the straps 45.

The flooring of Figure 8 like that of Figures 1 to 7, inclusive, possesses an extremely high strength-weight ratio and may be fabricated or produced with facility and at a low cost.

Whereas the invention has been described as a flooring for use in connection with aircraft it is to be understood that it has other capabilities of use. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A suspension type flooring comprising a pair of laterally spaced parallel horizontally extending sill-forming beams adapted to be mounted in fixed relation with a supporting structure, a rectangular corrugated panel extending longitudinally of and across the beams and having the side margins thereof connected to the upper portions of the beams and its corrugations extending transversely of said beams, an intermediate beam disposed equidistantly between and in parallel relation with the sill-forming beams, connected to, and depending from, the central portion of the corrugated panel, and embodying along its bottom margin a substantially full length upwardly inclined flange, and a longitudinal series of spaced apart transversely extending one-piece flat metal V-shaped straps disposed beneath the corrugated panel and having the apex portions thereof in underlying and abutting relation with said flange of the intermediate beam and their ends connected to the junctures of the side margins of the corrugated panel and the upper portions of the sill-forming beams in such manner that the straps are at all times under tension and exert upward force on the corrugated panel through said intermediate beam 2. A suspension type flooring comprising a pair of laterally spaced parallel horizontally extending sill-forming beams adapted to be mounted in fixed relation with a supporting structure and having inwardly extending flanges along their upper margins, a rectangular corrugated panel extending longitudinally of and across the beams and having the side margins thereof overlying and connected to the beam flanges and its corrugations extending transversely of said beams, longitudinally extending structural means connected to, and depending from, the central portion of the corrugated panel, a longitudinal series of spaced apart transversely extending one-piece flat metal straps having the central portions thereof in underlying and abutting relation with the bottom portion of said structural means and their ends fitting against and fixedly connected to the bottom faces of said beam flanges, and clamp means applied to the portions of the straps that are directly inwards of the strap ends and arranged so as to deflect and distort said last mentioned portions upwards into the plane of said flanges and cause the straps to be under tension at all times and to exert upward force on the corrugated panel through said structural means.

3. A suspension type flooring comprising a pair of laterally spaced parallel horizontally extending sill-forming beams adapted to be mounted in fixed relation with a supporting structure and provided along their upper margins with inwardly extending flanges, a rectangular corrugated panel extending lengthwise of and across the beams and having the side margins thereof overlying and connected to the beam flanges and its corrugations extending transversely of said beams, a single intermediate beam disposed midway between and in parallel relation with the sill-forming beams and connected to, and depending from, the central portion of the corrugated beam, a longitudinal series of spaced apart transversely extending V-shaped straps disposed beneath the corrugated panel and having the apex portions thereof in underlying and abutting relation with the bottom margin of the intermediate beam and their ends fitting flatly against and connected fixedly to the bottom faces of said beam flanges, and clamp means extending between the portions of the straps that are immediately inwards of the strap ends and the superjacent portions of the corrugated panel and arranged so as to deflect and distort said last mentioned portions upwards into the plane of said flanges and cause the straps to be under tension at all times and to exert upward force on the corrugated panel through said intermediate beam.

4. A suspension type flooring comprising a pair of laterally spaced parallel horizontally extending sill-forming beams adapted to be mounted in fixed relation with a supporting structure and provided along their upper margins with inwardly extending coplanar flanges, a flat rectangular plate extending longitudinally of and across the beams and having the side margins thereof connected to the beam flanges, a coextensive rectangular corrugated panel mounted on and connected to the plate, an intermediate beam disposed midway between and in parallel relation with the sill-forming beams and connected to, and depending from, the central portion of the plate, a longitudinal series of spaced apart transversely extending one-piece flat metal V-shaped straps disposed beneath the plate and having the apex portions thereof in underlying and abutting relation with the bottom margin of the intermediate beam and their ends fitting flatly against and connected fixedly to the bottom faces of said beam flanges, and bolts extending through the portions of the straps that are immediately inwards of the strap ends and the superjacent portions of the plate and corrugated panel and tightened to such an extent that they cause upward deflection and distortion of said portions of the straps into the plane of said beam flanges and result in the straps being at all times under tension and exerting an upward force on the central portions of the plate and panel through the medium of said intermediate beam.

5. A suspension type flooring comprising a pair of laterally spaced parallel substantially horizontal sill-forming beams adapted to be mounted in fixed relation with a supporting structure, a rectangular corrugated panel extending across and lengthwise of the beams and having the side margins thereof mounted on the upper portions of the beams and its corrugations extending transversely of said beams, an intermediate beam disposed midway between and in parallel relation with the sill-forming beams and connected to, and depending from, the central portion of the corrugated panel, a longitudinal series of spaced apart transversely extending V-shaped straps disposed beneath the corrugated panel and having the apex portions thereof in underlying and abutting relation with the lower margin of the intermediate beam and their ends connected to the junctures of the side margins of the corrugated panel and the upper portions of the sill-forming beams in such manner that the straps are at all times under tension and exert upward force on the corrugated panel through said intermediate beam, and a series of vertically extending stiffeners corresponding in number to and associated respectively with the straps, connected to the intermediate beam, and having the lower ends thereof in abutment with said apex portions of said straps.

6. A suspension type flooring comprising a pair of laterally spaced parallel substantially horizontal sill-forming beams adapted to be mounted in fixed relation with a supporting structure, a rectangular corrugated panel extending across and lengthwise of the beams and having the side margins thereof mounted on the upper portions of the beams and its corrugations extending transversely of said beams, an intermediate beam disposed midway between and in parallel relation with the sill-forming beams, connected to, and depending from, the central portion of the corrugated panel, and embodying along its bottom margin a full length flange projecting from one side face of the intermediate beam only and inclined upwards, a longitudinal series of spaced apart transversely extending one-piece flat metal V-shaped straps disposed beneath the corrugated panel and having the apex portions thereof in underlying and abutting relation with the flange of the intermediate beam and their ends connected to the junctures of the side margins of the corrugated panel and the upper portions of the sill-forming beams in such manner that said straps are at all times under tension and exert upward force on the corrugated panel through said intermediate beam, and a series of vertically extending angle bar stiffeners corresponding in number to and associated respectively with the straps, connected to the other side face of the intermediate beam and having the upper ends terminating adjacent the central portion of the corrugated panel and the lower ends in abutment with said apex portions of said straps.

7. A suspension type flooring comprising a pair of laterally spaced parallel substantially horizontal sill-forming beams adapted to be mounted in fixed relation with a supporting structure, a corrugated panel extending across the beams and having the side margins thereof mounted on the upper portions of the beams and its corrugations extending transversely of said beams, an intermediate beam disposed midway between, and in parallel relation with, the sill-forming beams and connected to, and depending from, the central portion of the corrugated panel, a longitudinal series of spaced apart transversely extending one-piece V-shaped straps disposed beneath the corrugated panel and having the apex portions thereof in underlying and abutting relation with the lower margin of said intermediate beam and their ends connected to the junctures of the side margins of the corrugated panel and the upper portions of the beams in such manner that the straps are at all times under tension and exert upward force on the corrugated panel through said structural means, and a corresponding longitudinal series of spaced apart transversely extending one-piece inverted V-shaped straps associated respectively with the V-shaped straps and having the apex portions thereof disposed beneath the central portion of said corrugated panel and overlying and directly engaging the upper margin of said intermediate beam and their ends connected to said V-shaped straps inwards of the latters' ends.

8. A suspension type flooring comprising a pair of laterally spaced parallel horizontally extending sill-forming beams adapted to be mounted in fixed relation with a supporting structure, a rectangular corrugated panel extending longitudinally of and across the beams and having the side margins thereof connected to the upper portions of the beams and its corrugations extending transversely of said beams, an intermediate beam disposed equidistantly between and in parallel relation with the sill-forming beams, connected to, and depending from, the central portion of the corrugated panel, and embodying along its bottom margin a full length upwardly inclined flange, and a longitudinal series of spaced apart transversely extending one-piece flat metal V-shaped straps disposed beneath the corrugated panel and having the apex portions thereof in underlying and abutting relation with the flange of the intermediate beam and their ends connected to the junctures of the side margins of the corrugated panel and the upper portions of the sill-forming beams.

9. A suspension type flooring comprising a pair of laterally spaced substantially horizontal parallel sill-forming beams adapted to be mounted in fixed relation with a supporting structure, a rectangular corrugated panel extending across and lengthwise of the beams and having the side margins thereof mounted on the upper portions of the beams and its corrugations extending transversely of said beams, an intermediate beam disposed midway between and in parallel relation with the sill-forming beams, connected to, and depending from, the central portion of the corrugated panel, and embodying along its bottom margin a full length flange projecting from one side face of the intermediate beam only and inclined upwards, a longitudinal series of spaced apart transversely extending one-piece flat metal V-shaped straps disposed beneath the corrugated panel and having the apex portions thereof in underlying and abutting relation with said flange of the intermediate beam and their ends connected to the junctures of the side margins of the corrugated panel and the upper portions of the sill-forming beams, and a series of vertically extending angle bar stiffeners corresponding in number to and associated respectively with the straps, connected to the other side face of the intermediate beam, and and having the lower ends thereof in abutment with said apex portions of said straps.

10. A suspension type flooring comprising a pair of laterally spaced parallel substantially horizontal sill-forming beams adapted to be mounted in fixed relation with a supporting structure, a corrugated panel extending across the beams and having the side margins thereof mounted on the upper portions of the beams and its corrugations extending transversely of said beams, an intermediate beam disposed midway between, and in parallel relation with, the sill-forming beams and connected to, and depending from, the central portion of the corrugated panel, a longitudinal series of spaced apart transversely extending one-piece flat metal V-shaped straps disposed beneath the corrugated panel and having the apex portions thereof in underlying and abutting relation with the lower margin of said intermediate beams and their ends connected to the junctures of the side margins of the corrugated panel and the upper portions of the beams, and a corresponding longitudinal series of spaced apart transversely extending one-piece flat metal inverted V-shaped straps associated respectively with the V-shaped straps and having the apex portions thereof disposed beneath the central portion of said corrugated panel and overlying and directly engaging the upper margin of said intermediate beam and their ends connected to said V-shaped straps inwards of the latters' ends.

JOSEPH A. KOSEK.